(12) United States Patent
Huang et al.

(10) Patent No.: US 11,524,491 B2
(45) Date of Patent: Dec. 13, 2022

(54) METHOD FOR MANUFACTURING THICK POLYIMIDE FILM

(71) Applicant: Zhen Ding Technology Co., Ltd., Taoyuan (TW)

(72) Inventors: Wei-Hsin Huang, Taoyuan (TW); Chi-Fei Huang, Taoyuan (TW); Szu-Hsiang Su, Taoyuan (TW); Shou-Jui Hsiang, Tayuan (TW); Kuan-Wei Lee, Taoyuan (TW)

(73) Assignee: Zhen Ding Technology Co., Ltd., Taoyuan (TW)

( * ) Notice: Subject to any disclaimer, the term of this patent is extended or adjusted under 35 U.S.C. 154(b) by 54 days.

(21) Appl. No.: 17/107,787

(22) Filed: Nov. 30, 2020

(65) Prior Publication Data
US 2022/0152912 A1    May 19, 2022

(30) Foreign Application Priority Data
Nov. 17, 2020    (CN) .......................... 202011288794.8

(51) Int. Cl.
*B32B 27/28*    (2006.01)
*B29C 53/56*    (2006.01)
(Continued)

(52) U.S. Cl.
CPC .......... *B32B 27/281* (2013.01); *B29C 53/005* (2013.01); *B29C 53/16* (2013.01);
(Continued)

(58) Field of Classification Search
CPC ... B32B 27/281; B32B 2250/04; B32B 37/02; B32B 37/025; B32B 37/203; B32B 37/20; B29C 53/56
(Continued)

(56) References Cited

U.S. PATENT DOCUMENTS 4,252,596 A * 2/1981 Fuglein ...................... C09J 7/20
                                                        118/235
5,328,536 A * 7/1994 Rohleder ............ B32B 38/0036
                                                        264/211.17
(Continued)

FOREIGN PATENT DOCUMENTS

TW        485062 B      5/2002
TW      201736139 A    10/2017
(Continued)

*Primary Examiner* — Benjamin A Schiffman
(74) *Attorney, Agent, or Firm* — ScienBiziP, P.C.

(57) ABSTRACT

A method for manufacturing a thick polyimide film includes providing a first and second laminated structures. The first and second laminated structures are heated, and the heated first and second laminated structures are wound together to form a third laminated structure. The first polyamic acid gel film of the heated first laminated structure and the second polyamic acid gel film of the heated second laminated structure are overlapped and bonded together to form a third polyamic acid gel film. Two third laminated structures are wound together to form a fourth polyamic acid gel film. A dehydration ring-closure imidization reaction is applied to the fourth polyamic acid gel film by heating to obtain the thick polyimide film. A thick polyimide film manufactured by the method is also disclosed.

11 Claims, 3 Drawing Sheets

(51) Int. Cl.
*B32B 37/02* (2006.01)
*B29C 53/00* (2006.01)
*B29C 53/16* (2006.01)
*B32B 38/10* (2006.01)
*B32B 38/00* (2006.01)
*B32B 37/20* (2006.01)
*B29K 105/00* (2006.01)
*C08G 73/10* (2006.01)
*B29K 79/00* (2006.01)
*C08G 69/32* (2006.01)

(52) U.S. Cl.
CPC .............. *B29C 53/56* (2013.01); *B32B 37/02* (2013.01); *B32B 37/203* (2013.01); *B32B 38/0036* (2013.01); *B32B 38/10* (2013.01); B29K 2079/08 (2013.01); B29K 2105/256 (2013.01); B32B 2038/0028 (2013.01); B32B 2038/0076 (2013.01); B32B 2250/04 (2013.01); B32B 2250/24 (2013.01); B32B 2255/26 (2013.01); B32B 2309/02 (2013.01); B32B 2309/04 (2013.01); B32B 2379/08 (2013.01); C08G 69/32 (2013.01); C08G 73/1028 (2013.01)

(58) Field of Classification Search
USPC ..... 156/182, 184, 229, 242, 264, 249, 330.9
See application file for complete search history.

(56) References Cited

U.S. PATENT DOCUMENTS

| | | | |
|---|---|---|---|
| 6,209,377 B1* | 4/2001 | Shore | B21B 31/04 72/248 |
| 2007/0071910 A1* | 3/2007 | Ono | C09J 7/22 428/1.1 |
| 2008/0070016 A1* | 3/2008 | Hwang | C08G 73/1007 428/458 |
| 2011/0094667 A1* | 4/2011 | Schulze | B32B 37/025 156/247 |

FOREIGN PATENT DOCUMENTS

| | | | | |
|---|---|---|---|---|
| TW | I758954 B | * | 3/2022 | C08J 5/18 |
| TW | 202221069 A | * | 6/2022 | C08J 5/18 |

* cited by examiner

METHOD FOR MANUFACTURING THICK POLYIMIDE FILM

FIELD

The subject matter herein generally relates to polyimide for printed circuits, especially to a thicker polyimide film and a method for manufacturing the same.

BACKGROUND

In general, a polyamic acid solution may be flow-cast onto a steel strip, followed by a drying process to form a semi-solid film, and then the semi-solid film is peeled off. The semi-solid film is stretched and imidized to obtain a polyimide film, and then the polyimide film is collected on a coiling roller. The polyamic acid solution must be dried for a certain period of time to form the semi-solid film. However, when a thickness of the polyimide film is more than 200 μm, the drying process requires a low wind speed of the polyimide film to below 1 m/min, which may reduce the processing efficiency. Existing processing apparatus cannot produce a polyimide film with a thickness more than 400 μm.

BRIEF DESCRIPTION OF THE DRAWINGS

Implementations of the present technology will now be described, by way of embodiment, with reference to the attached figures.

DETAILED DESCRIPTION

Figure 1:
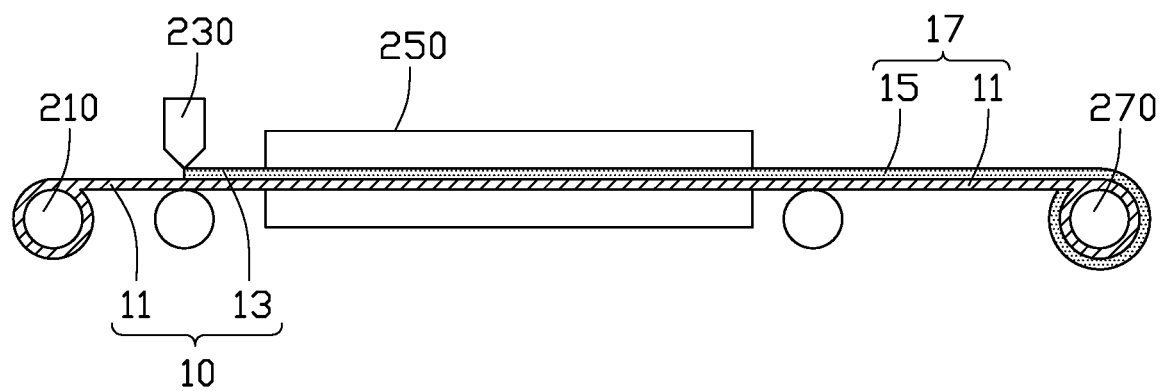
FIG. 1 is a schematic view showing preparation processes of a first laminated structure in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

The term "comprising," when utilized, means "including, but not necessarily limited to"; it specifically indicates open-ended inclusion or membership in the so-described combination, group, series, and the like. When a first component is referred to as "connecting" to a second component, it is intended that the first component may be directly connected to the second component or may be indirectly connected to the second component via a third component between them.

A method for manufacturing a thick polyimide film of one embodiment includes the following steps S1 to S5.

Referring to FIG. 1, at step S1, a first laminated structure 10 is provided and heated. The first laminated structure 10 includes a first supporting film 11 and a first polyamic acid coating film 13 coated on the first supporting film 11. The first polyamic acid coating film 13 is heated to form a first polyamic acid gel film 15. The heated first laminated structure 17 includes the first supporting film 11 and the first polyamic acid gel film 15 coated on the first supporting film 11.

The step S1 includes conveying the first supporting film 11 from a first unwinding roller 210 to a first coating device 230, a first oven 250, and a first winding roller 270 in that order. When the first supporting film 11 is conveyed to the first coating device 230, a polyamic acid solution is, by the first coating device 230, coated onto the first supporting film 11 to form the first polyamic acid coating film 13. When the first laminated structure 10 is conveyed to the first oven 250 to be heated, a part of inorganic solvent of the first polyamic acid coating film 13 is removed, thereby forming the first polyamic acid gel film 15. The first unwinding roller 210 unwinds the first supporting film 11. The first winding roller 270 winds the heated first laminated structure 17.

A dianhydride monomer, a diamine monomer, and an organic solvent are mixed and react together to form the polyamic acid solution. The dianhydride monomer is selected from a group consisting of tetrabenzoic dianhydride (PMDA), 4,4'-(hexafluoroisopropylene) diphthalic anhydride (6FDA), and 1,2,3,4-cyclobutane carboxylic dianhydride (CBDA). The diamine monomer is selected from a group consisting of 4,4'-diaminodiphenyl ether (ODA), p-phenylenediamine (p-PDA), and 3,5-diamino-1,2,4-triazole (DTZ). The organic solvent is selected from a group consisting of dimethylacetamide (DMAc), N-methylpyrrolidone (NMP), and N,N-dimethylformamide (DMF).

Figure 2:
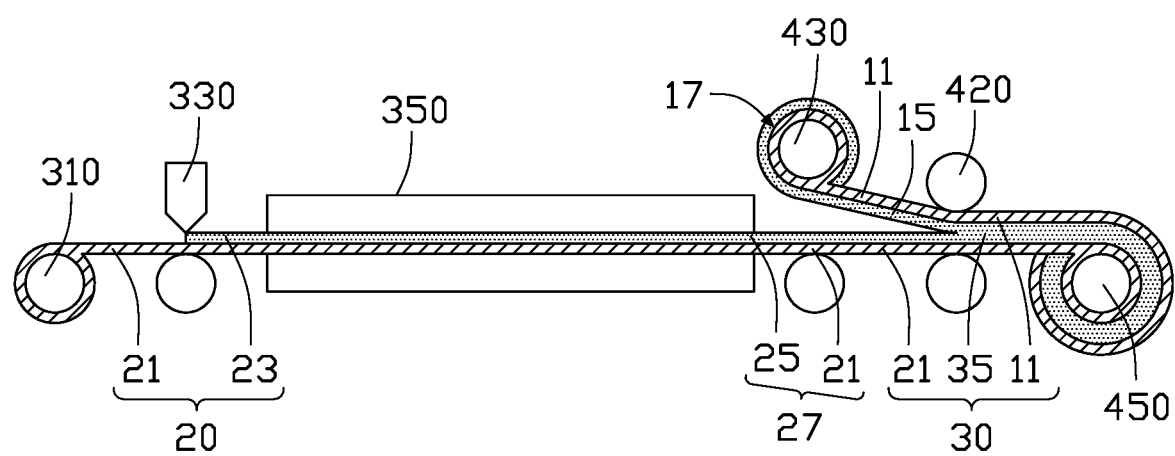
FIG. 2 is a schematic view showing preparation processes for winding a first laminated structure and a second laminated structure together in accordance with an embodiment.

Referring to FIG. 2, at step S2, a second laminated structure 20 is provided and heated. The second laminated structure 20 includes a second supporting film 21 and a second polyamic acid coating film 23 coated on the second supporting film 21. The second polyamic acid coating film 23 is heated to form a second polyamic acid gel film 25. The heated second laminated structure 27 includes the second supporting film 21 and the second polyamic acid gel film 25 coated on the second supporting film 21.

The step S2 includes conveying the second supporting film 21 from a second unwinding roller 310 to a second coating device 330 and a second oven 350 in that order. When the second supporting film 21 is conveyed to the second coating device 330, the polyamic acid solution is, by the second coating device 330, coated onto the second supporting film 21 to form the second polyamic acid coating film 23. When the second laminated structure 20 is conveyed to the second oven 350 to be heated, a part of inorganic solvent of the second polyamic acid coating film 23 is removed, thereby forming the second polyamic acid gel film 25.

According to an embodiment, heating temperatures of the first oven 250 and the second oven 350 are both in a range of 110° C. to 150° C., a weight percent of the organic solvent in each of the first polyamic acid gel film 15 and the second polyamic acid gel film 25 is in a range of 30% to 45%.

According to an embodiment, the first supporting film 11 and the second supporting film 21 are both releasing films which facilitate the peeling off of the polyamic acid gel film.

Referring to FIG. 2, at step S3, the heated first laminated structure 17 and the heated second laminated structure 27 are overlapped and wound together to obtain a third laminated structure 30. The first polyamic acid gel film 15 and the second polyamic acid gel film 25 are overlapped and bonded together to form a third polyamic acid gel film 35. The third laminated structure 30 includes the first supporting film 11, the second supporting film 21, and the third polyamic acid gel film 35 sandwiched between the first supporting film 11 and the second supporting film 21.

The step S3 includes conveying the heated first laminated structure 17 and the heated second laminated structure 27 to a gap between two first pressure rollers 420, the heated first laminated structure 17 and the heated second laminated structure 27 being overlapped in the gap to obtain the third laminated structure 30. The first polyamic acid gel film 15 and the second polyamic acid gel film 25 are pressed together to form the third polyamic acid gel film 35. The heated first laminated structure 17 is unwound via a third unwinding roller 430, and the unwound heated first laminated structure 17 is directly wound together with the heated second laminated structure 20 conveyed from the second oven 350. The third laminated structure 30 is wound on a second winding roller 450.

Figure 3:
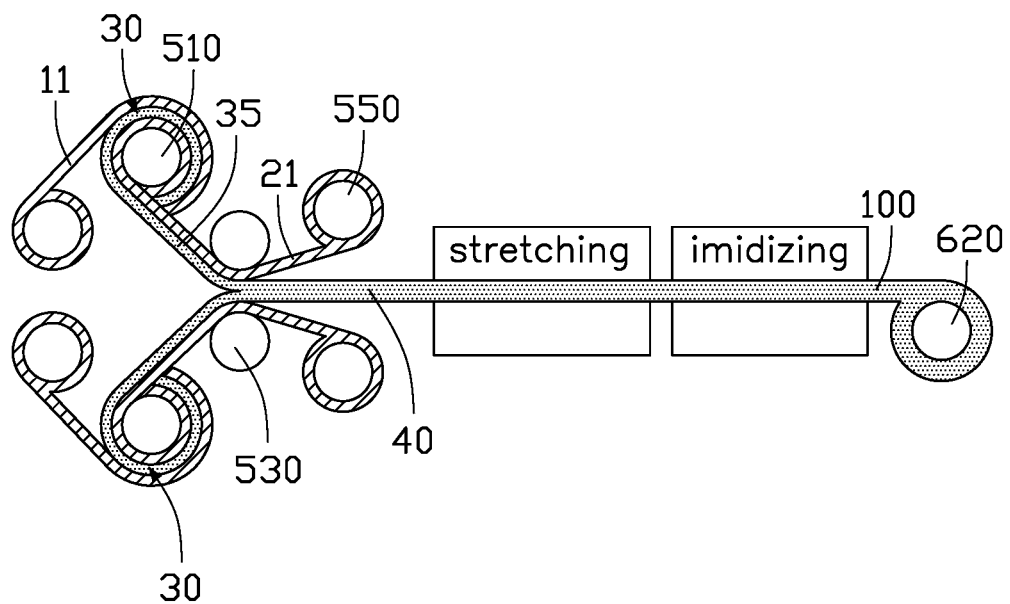
FIG. 3 is a schematic view showing processes for winding two third laminated structures to obtain a thick polyimide film in accordance with an embodiment.

Referring to FIG. 3, at step S4, two third laminated structures 30 are overlapped and wound together, and two third polyamic acid gel films 35 of the two third laminated structures 30 are overlapped and bonded together to form a fourth polyamic acid gel film 40.

The step S4 includes winding each of the two first supporting films 11 of the two laminated structures 30 to expose a corresponding one third polyamic acid gel films 35, and then conveying two third laminated structures 30 from two fourth unwinding rollers 510 to a gap between two second pressure rollers 530. The exposed third polyamic acid gel films 35 are pressed together to form the fourth polyamic acid gel film 40, and then two second supporting films 21 of the two laminated structures 30 are wound via two third winding rollers 550 to expose the fourth polyamic acid gel film 40.

According to an embodiment, a temperature of each of the first pressure rollers 420 and the second pressure rollers 530 is in a range of room temperature to 100° C.

Referring to FIG. 3, at step S5, the fourth polyamic acid gel film 40 is heated for imidization to obtain the thick polyimide film 100. A thickness of the thick polyimide film 100 is more than 200 μm.

According to an embodiment, a heating temperature of the fourth polyamic acid gel film 40 is in a range of 250° C. to 400° C.

According to an embodiment, a thickness of each of the first polyamic acid gel film 15 and the second polyamic acid gel film 25 is a quarter of a thickness of the fourth polyamic acid gel film 40. A ratio of the thickness of each of the first polyamic acid gel film 15 and the second polyamic acid gel film 25 to the thickness of the fourth polyamic acid gel film 40 may be set according to needs. In an alternative embodiment, more than two third polyamic acid gel films 35 may be overlapped and wound together to obtain the fourth polyamic acid gel film 40 with a predetermined thickness.

Furthermore, the method further includes a step of stretching the fourth polyamic acid gel film 40 before heating the fourth polyamic acid gel film 40.

In the method, the first polyamic acid gel film 15 and the second polyamic acid gel film 25 are overlapped and wound together to obtain the third polyamic acid gel film 35, and several third polyamic acid gel films 35 are overlapped and wound together to the fourth polyamic acid gel film 40 with an increased thickness. Since each of the thicknesses of the first polyamic acid gel film 15 and the second polyamic acid gel film 25 is small, the time for heating and curing the polyamic acid is reduced, thereby improving the processing efficiency.

The present disclosure is illustrated by way of different examples.

EXAMPLE 1

The first supporting film 11 was conveyed from the first unwinding roller 210 to the first coating device 230, the first oven 250, and the first winding roller 270 in that order. The polyamic acid solution was, by the first coating device 230, coated onto the first supporting film 11 to form the first polyamic acid coating film 13. The thickness of the first polyamic acid coating film 13 was 50 μm. An unwinding speed of the first unwinding roller 210 and a winding speed of the first winding roller 270 were both 6 m/min. The heating temperature of the first oven 250 was in a range of 110° C. to 150° C., a heating time of the first oven 250 was 2.5 minutes, the weight percent of the organic solvent in the first polyamic acid gel film 15 was in a range of 30% to 45%. The first unwinding roller 210 and the first winding roller 270 both worked for 5.6 hours to prepare the first polyamic acid gel film 15 with a length of 2000 meters.

The second supporting film 21 was conveyed from the second unwinding roller 310 to the second coating device 330 and the second oven 350 in that order. The polyamic acid solution was, by the second coating device 330, coated onto the second supporting film 21 to form the second polyamic acid coating film 23. The thickness of the second polyamic acid coating film 23 was 50 μm. The heated second laminated structure 27 conveyed from the second oven 350 and the heated first laminated structure 17 wound from the third unwinding roller 430 were conveyed to the gap between two first pressure rollers 420 and the second winding roller 450 in that order. The unwinding speeds of the second unwinding roller 310 and the third unwinding roller 430 and the winding speed of the second winding roller 270 were both 6 m/min. The heating temperature of the second oven 350 was in a range of 110° C. to 150° C., the heating time of the second oven 350 was 2.5 minutes. The weight percent of the organic solvent in the second polyamic acid gel film 25 was in a range of 30% to 45%. The temperature of the first pressure rollers 420 was in a range of the room temperature to 100° C. The thickness of the third polyamic acid gel film 35 was 100 μm. The second unwinding roller 310, the third unwinding roller 430, and the second winding roller 270 all worked for 5.6 hours to prepare the third polyamic acid gel film 35 with a length of 2000 meters.

Two first supporting films 11 of the two third laminated structures 30 were respectively wound to expose the third polyamic acid gel film 35, and the two laminated structures 30 were respectively conveyed from two fourth unwinding rollers 510 to the gap between the two second pressure rollers 530. The two third winding rollers 550 wound two second supporting films 21 of the two third laminated structures 30, and then the fourth polyamic acid gel film 40 was stretched, was given a dehydration ring-closure imidization reaction by heating, and was wound on the fourth winding roller 620, thereby obtaining the thick polyimide film 100. The unwinding speeds of the fourth unwinding rollers 510 and the winding speed of the fourth winding roller 620 were both 5 m/min. The temperature of the second pressure rollers 530 was in a range of the room temperature to 100° C. The heating temperature at which the fourth polyamic acid gel film 40 was imidized was in a range of 250° C. to 400° C., and the heating time of the fourth polyamic acid gel film 40 was 5 minutes. The thickness of the thick polyimide film 100 was 200 μm. The fourth unwinding rollers 510 and the fourth winding roller 620 worked for 3.5 hours to prepare the thick polyimide film 100 with a length of 1000 meters.

EXAMPLE 2

The first supporting film 11 was conveyed from the first unwinding roller 210 to the first coating device 230, the first oven 250, and the first winding roller 270 in that order. By the first coating device 230, the polyamic acid solution was coated onto the first supporting film 11 to form the first polyamic acid coating film 13. The thickness of the first polyamic acid coating film 13 was 100 μm. An unwinding speed of the first unwinding roller 210 and a winding speed of the first winding roller 270 were both 5 m/min. The heating temperature of the first oven 250 was in a range of 110° C. to 150° C., a heating time of the first oven 250 was 3 minutes, and the weight percent of the organic solvent in the first polyamic acid gel film 15 was in a range of 30% to 45%. The first unwinding roller 210 and the first winding roller 270 both worked for 6.7 hours to prepare the first polyamic acid gel film 15 with a length of 2000 meters.

The second supporting film 21 was conveyed from the second unwinding roller 310 to the second coating device 330 and the second oven 350 in that order. By the second coating device 330, the polyamic acid solution was coated onto the second supporting film 21 to form the second polyamic acid coating film 23. The thickness of the second polyamic acid coating film 23 was 100 μm. And then the heated second laminated structure 27 conveyed from the second oven 350 and the heated first laminated structure 17 wound from the third unwinding roller 430 were conveyed to the gap between two first pressure rollers 420 and the second winding roller 450 in that order. The unwinding speeds of the second unwinding roller 310 and the third unwinding roller 430 and the winding speed of the second winding roller 270 were both 5 m/min. The heating temperature of the second oven 350 was in a range of 110° C. to 150° C., the heating time of the second oven 350 was 3 minutes, and the weight percent of the organic solvent in the second polyamic acid gel film 25 was in a range of 30% to 45%. The temperature of the first pressure rollers 420 was in a range of the room temperature to 100° C. The thickness of third polyamic acid gel film 35 was 200 μm. The second unwinding roller 310, the third unwinding roller 430, and the second winding roller 270 all worked for 6.7 hours to prepare the third polyamic acid gel film 35 with a length of 2000 meters.

Two first supporting films 11 of the two third laminated structures 30 were respectively wound to expose the third polyamic acid gel film 35, and the two laminated structures 30 were respectively conveyed from two fourth unwinding rollers 510 to the gap between the two second pressure rollers 530. The two third winding rollers 550 wound two second supporting films 21 of the two third laminated structures 30, and then the fourth polyamic acid gel film 40 was stretched, was given a dehydration ring-closure imidization reaction by heating, and was wound on the fourth winding roller 620, thereby obtaining the thick polyimide film 100. The unwinding speeds of the fourth unwinding rollers 510 and the winding speed of the fourth winding roller 620 were both 4 m/min. The temperature of the second pressure rollers 530 was in a range of the room temperature to 100° C. The heating temperature at which the fourth polyamic acid gel film 40 was imidized was in a range of 250° C. to 400° C., and the heating time of the fourth polyamic acid gel film 40 was 6 minutes. The thickness of the thick polyimide film 100 was 400 μm. The fourth unwinding rollers 510 and the fourth winding roller 620 worked for 4.4 hours to prepare the thick polyimide film 100 with a length of 1000 meters.

EXAMPLE 3

The first supporting film 11 was conveyed from the first unwinding roller 210 to the first coating device 230, the first oven 250, and the first winding roller 270 in that order. By the first coating device 230, the polyamic acid solution was coated onto the first supporting film 11 to form the first polyamic acid coating film 13. The thickness of the first polyamic acid coating film 13 was 150 μm. An unwinding speed of the first unwinding roller 210 and a winding speed of the first winding roller 270 were both 4 m/min. The heating temperature of the first oven 250 was in a range of 110° C. to 150° C., a heating time of the first oven 250 was 3.8 minutes, and the weight percent of the organic solvent in the first polyamic acid gel film 15 was in a range of 30% to 45%. The first unwinding roller 210 and the first winding roller 270 both worked for 8.4 hours to prepare the first polyamic acid gel film 15 with a length of 2000 meters.

The second supporting film 21 was conveyed from the second unwinding roller 310 to the second coating device 330 and the second oven 350 in that order. By the second coating device 330, the polyamic acid solution was coated onto the second supporting film 21 to form the second polyamic acid coating film 23. The thickness of the second polyamic acid coating film 23 was 50 μm. And then the heated second laminated structure 27 conveyed from the second oven 350 and the heated first laminated structure 17 wound from the third unwinding roller 430 were conveyed to the gap between two first pressure rollers 420 and the second winding roller 450 in that order. The unwinding speeds of the second unwinding roller 310 and the third unwinding roller 430 and the winding speed of the second winding roller 270 were both 4 m/min. The heating temperature of the second oven 350 was in a range of 110° C. to 150° C., the heating time of the second oven 350 was 3.8 minutes, the weight percent of the organic solvent in the second polyamic acid gel film 25 was in a range of 30% to 45%. The temperature of the first pressure rollers 420 was in a range of the room temperature to 100° C. The thickness of third polyamic acid gel film 35 was 300 μm. The second unwinding roller 310, the third unwinding roller 430, and the second winding roller 270 all worked for 8.4 hours to prepare the third polyamic acid gel film 35 with a length of 2000 meters.

Two first supporting films 11 of the two third laminated structures 30 were respectively wound to expose the third polyamic acid gel film 35, and the two laminated structures 30 were respectively conveyed from two fourth unwinding rollers 510 to the gap between the two second pressure rollers 530. Two third winding rollers 550 wound two second supporting films 21 of the two third laminated structures 30, and then the fourth polyamic acid gel film 40 was stretched and given a dehydration ring-closure imidization reaction by heating, and was wound on the fourth winding roller 620, thereby obtaining the thick polyimide film 100. The unwinding speeds of the fourth unwinding rollers 510 and the winding speed of the fourth winding roller 620 were both 3 m/min. The temperature of the second pressure rollers 530 was in a range of the room temperature to 100° C. The heating temperature at which the fourth polyamic acid gel film 40 was imidized was in a range of 250° C. to 400° C., and the heating time of the fourth polyamic acid gel film 40 was 8 minutes. The thickness of the thick polyimide film 100 was 600 μm. The fourth unwinding rollers 510 and the fourth winding roller 620 worked for 5.8 hours to prepare the thick polyimide film 100 with a length of 1000 meters.

Examples 1-3 show that, by adopting the method of the disclosure, the thick polyimide film 100 with the thickness of 200 μm to 600 μm can be prepared, and the winding speeds of the rollers applied to prepare the polyamic acid gel films are in a range of 4 m/min to 6 m/min.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A method for manufacturing a thick polyimide film comprising:
    providing a first laminated structure, the first laminated structure comprising a first supporting film and a first polyamic acid coating film coated on the first supporting film;
    heating the first laminated structure, the first polyamic acid coating film being heated to form a first polyamic acid gel film;
    providing a second laminated structure, the second laminated structure comprising a second supporting film and a second polyamic acid coating film coated on the second supporting film;
    heating the first laminated structure, the second polyamic acid coating film being heated to form a second polyamic acid gel film;
    winding the heated first laminated structure and the heated second laminated structure together to obtain a third laminated structure, wherein the first polyamic acid gel film and the second polyamic acid gel film are overlapped and bonded together to form a third polyamic acid gel film;
    winding two third laminated structures together, wherein two third polyamic acid gel films of the two third laminated structures are overlapped and bonded together to form a fourth polyamic acid gel film; and
    imidizing the fourth polyamic acid gel film by heating to obtain the thick polyimide film.

2. The method of claim 1, wherein a thickness of each of the first polyamic acid gel film and the second polyamic acid gel film is a quarter of a thickness of the fourth polyamic acid gel film.

3. The method of claim 1, wherein a thickness of the fourth polyamic acid gel film is in a range of 200 μm to 600 μm, a heating temperature of each of the first laminated structure and the second laminated structure is in a range of 110° C. to 150° C., and a heating time of each of the first laminated structure and the second laminated structure is in a range of 2.5 minutes to 3.8 minutes.

4. The method of claim 1, further comprising stretching the fourth polyamic acid gel film before imidizing the fourth polyamic acid gel film.

5. The method of claim 1, wherein a method of winding two third laminated structures together comprises:
    winding two first supporting films of the two third laminated structures to expose two third polyamic acid gel films, and unwinding and conveying the two third laminated structures to a gap between two second pressure rollers, wherein the exposed third polyamic acid gel films are pressed together to form the gel form of the fourth polyamic acid film.

6. The method of claim 5, wherein after conveying the two third laminated structures to a gap between two second pressure rollers, the method further comprises winding two second supporting films of the two third laminated structures to expose the fourth polyamic acid gel film.

7. The polyimide film of claim 5, wherein a temperature of each of the two second pressure rollers is in a range of room temperature to 100° C.

8. The method of claim 1, wherein a heating temperature of the fourth polyamic acid gel film is in a range of 250° C. to 400° C.

9. The method of claim 1, wherein a method of providing a first laminated structure and heating the first laminated structure comprises conveying the first supporting film from a first unwinding roller to a first coating device, a first oven, and a first winding roller in said order, a polyamic acid solution is coated onto the first supporting film to form the first polyamic acid coating film when the first supporting film is conveyed to the first coating device.

10. The method of claim 9, wherein a method of providing a second laminated structure and heating the second laminated structure comprises conveying the second supporting film from a second unwinding roller to a second coating device and a second oven in said order, the polyamic acid solution is coated onto the second supporting film to form the second polyamic acid coating film when the second supporting film is conveyed to the second coating device.

11. The method of claim 10, wherein a method of winding the heated first laminated structure and the heated second laminated structure together to obtain a third laminated structure comprises:
    unwinding the heated first laminated structure; and
    conveying the unwound heated first laminated structure and the heated second laminated structure conveyed from the second oven to a gap between two first pressure rollers, wherein the heated first laminated structure and the heated second laminated structure are overlapped in the gap between the two first pressure rollers to obtain the third laminated structure.

* * * * *